United States Patent
Lee et al.

(10) Patent No.: US 7,318,104 B1
(45) Date of Patent: *Jan. 8, 2008

(54) USER PROFILE INFORMATION DATA STRUCTURE BASED ON USER PREFERENCE AND MULTIMEDIA DATA BROWSING SYSTEM USING THE SAME

(75) Inventors: Jin Soo Lee, Seoul (KR); Kyoung Ro Yoon, Seoul (KR)

(73) Assignee: LG Electronics, Inc., Seoul (KR)

( * ) Notice: Subject to any disclaimer, the term of this patent is extended or adjusted under 35 U.S.C. 154(b) by 434 days.

This patent is subject to a terminal disclaimer.

(21) Appl. No.: 09/667,072

(22) Filed: Sep. 21, 2000

(30) Foreign Application Priority Data

Sep. 22, 1999 (KR) .............................. 1999/41137

(51) Int. Cl.
*G06F 15/16* (2006.01)

(52) U.S. Cl. ............... 709/231; 709/203; 709/223; 725/46; 725/47

(58) Field of Classification Search ............. 709/203, 709/217–219, 223–224, 200–201, 231, 232; 345/723; 707/3, 5, 10, 104.1; 725/46, 47
See application file for complete search history.

(56) References Cited

U.S. PATENT DOCUMENTS

| | | | |
|---|---|---|---|
| 5,758,257 A | | 5/1998 | Herz et al. |
| 5,920,856 A | | 7/1999 | Syeda-Mahmood |
| 5,945,988 A | * | 8/1999 | Williams et al. ............. 725/46 |
| 5,991,735 A | * | 11/1999 | Gerace ........................ 705/10 |
| 6,005,565 A | * | 12/1999 | Legall et al. ............... 345/721 |
| 6,029,045 A | | 2/2000 | Picco et al. |
| 6,029,195 A | * | 2/2000 | Herz ........................... 707/10 |
| 6,236,395 B1 | * | 5/2001 | Sezan et al. ............... 345/723 |
| 6,345,274 B1 | * | 2/2002 | Zhu et al. ..................... 707/5 |
| 6,411,724 B1 | * | 6/2002 | Vaithilingam et al. ... 707/104.1 |
| 6,460,036 B1 | * | 10/2002 | Herz ........................... 707/10 |
| 6,530,083 B1 | * | 3/2003 | Liebenow .................... 725/46 |
| 6,546,135 B1 | * | 4/2003 | Lin et al. .................. 707/104.1 |
| 6,593,936 B1 | * | 7/2003 | Huang et al. ............... 345/619 |

(Continued)

FOREIGN PATENT DOCUMENTS

CN 1171582 A 1/1998

(Continued)

OTHER PUBLICATIONS

Hu et al, "MD2 L : Content Description of Multimedia Documents for Efficient Process and Dearch/Retrieval" IEEE, May 19-21, 1999.*

(Continued)

*Primary Examiner*—Philip Tran
(74) *Attorney, Agent, or Firm*—Sidley Austin LLP

(57) ABSTRACT

The present invention relates to an user profile information data structure for browsing of multimedia data and a multimedia browsing method using the same.

The multimedia data browsing method is characterized in that: (a) multimedia data contains a contents description scheme for indexing/browsing based on contents; (b) an user profile includes an user preference description scheme indicating an user-preferred multimedia browsing method or browsing criterion; and (c) multimedia data is browsed by analyzing the user-preferred application description scheme for user-preferred browsing in a corresponding user profile, if the user desires multimedia browsing.

17 Claims, 8 Drawing Sheets

U.S. PATENT DOCUMENTS

| | | |
|---|---|---|
| 6,594,699 B1 * | 7/2003 | Sahai et al. ................. 709/228 |
| 6,684,399 B1 | 1/2004 | Grooters |
| 6,836,799 B1 | 12/2004 | Philyaw et al. |

FOREIGN PATENT DOCUMENTS

| | | |
|---|---|---|
| JP | 10-207901 | 8/1998 |
| JP | 10254912 | 9/1998 |
| JP | 11134345 | 5/1999 |
| WO | WO 99/39281 | 8/1999 |
| WO | WO 99/45709 | 9/1999 |

OTHER PUBLICATIONS

Cosmas et al., "Custom TV system and demonstration", Jun. 7, 1999, pp. 1110-1113 IEEE Comput. Soc., Los Alamitos, CA.

Christel et al., "Techniques for the Creation and Exploration of Digital Video Libraries", 1996, pp. 1-33, Multimedia Tools and Applications, Boston US.

Tomonari Kamba "Personalized Online Newspaper" NEC vol. 49, No. 7, 1996, pp. 11-16 (Non-English).

Japanese Office Action dated Jan. 4, 2006 for Japanese Patent Application No. 2000-289131, 2 pages.

Takako Hashimoto et al., "Prototype of Digest Making and Viewing System for Television," vol. 99 No. 61, Jul. 23, 1999, pp. 133-138, Journal of Information Processing Society, Japan.

Japanese Office Action dated Jul. 18, 2006 for Japanese Patent Application No. 2004-321938, 3 pages.

Y. Yagawa et al., "TV Program Planning Agent Using Analysis Method of User's Taste," Technical Report of IEICE A198-55, vol. 98 No. 437, Dec. 1, 1998, pp. 9-17.

Canadian Office Action for Canadian Application No. 2,320,510 (4 pages), Jun. 2005.

* cited by examiner

FIG. 5

```
                Functionality
501  ──►<Basic Key Item>
503  ──────►<Key-Item 1>="Character"</Key-Item 1>
504  ──────►<Key-Item 2>="Relation between Key-Item 1"</Key-Item 1>
                </Basic Key Itrm>
502  ──►<Order of Key Item>
                    <Key-Item 1>="priority" </Key-Item 1>
                    <Key-Item 2>="priority" </Key-Item 1>
                </Order of Key Item>
```

FIG. 7

```
Functionality
701 ─ <Basic Key Item>
         <Key-Item 1>="key-frame"</key-Item 1>
      </Basic Key Itrm>
701 ─ <Order of Key Item>
         <Key-Item 1>="time" </Key-Item 1>
      </Order of Key Item>
      <Depth of key Item>
         <level 1>="3" </level 1>
      </Depth of key Item>
```

USER PROFILE INFORMATION DATA STRUCTURE BASED ON USER PREFERENCE AND MULTIMEDIA DATA BROWSING SYSTEM USING THE SAME

BACKGROUND OF THE INVENTION

1. Field of the Invention

The present invention relates to an user profile information data structure for browsing of multimedia data and a multimedia browsing method using the same, and more particularly, to a content-based multimedia data indexing and browsing system in which an user-preferred browsing method is contained in an user profile, and multimedia browsing based on user preference is provided using an user-preferred browsing information contained in this profile, in implementing multimedia data browsing.

2. Description of the Background Art

In multimedia data indexing and browsing in the conventional art, there have been introduced techniques for variously displaying multimedia data based on user preference.

In internet shopping by using of a multimedia data indexing and browsing system based on user preference, there is a method of selecting only preferred items stored in an user profile by each user and displaying each product in a different way, not displaying all information items used in the internet shopping.

For example, in the case that some user mainly uses price and specification information, some user mainly uses design information, and some user mainly uses product information of a certain particular company in checking electronic products through the internet shopping, each user is given the above preferred information as its own user profile. In case that an user mainly uses price and specification in this preferred information, merely the information containing only price and specification is displayed to the user although other information such as photographs is provided by the user. And, in case of an user who prefers design information, design (photograph) information is mainly displayed. In this way, the information appropriate for the preference of each user is displayed.

In addition, there have been introduced techniques for providing a terminal desk-top interface such as a computer to an user in an user-desired form in a multimedia indexing and browsing system based on user preference in the conventional art.

In other words, the terminal desk-top interface that the corresponding user prefers (or designates) is recorded in its user profile, and then the form of the interface stored in the corresponding user profile is provided to the user.

Besides, there have been techniques for supporting help information in the form that user prefers using the recorded usage pattern of user in another conventional art.

The above-mentioned techniques considering user preference (use pattern) in the conventional art all reflects partial user preference in the current restricted application.

Nowadays, the content description is described in the data for supporting the content-based multimedia indexing/browsing. In the case the various browsing method are possible, so if there is the information describing user preference, user can browse multimedia data in the preferred browsing method using preferred browser.

In other words, among a variety of browsers for performing content-based multimedia data indexing and browsing, there may be browsers that is particularly preferred, or browsers that is preferred by the type of multimedia data to the user. However, since the maintenance and management of such data is not achieved, the user cannot enjoy his or her right to various selection, but also must be satisfied with parts of the browsers restrictively provided in a given environment.

SUMMARY OF THE INVENTION

Accordingly, it is an object of the present invention to provide a user profile information structure in which multimedia data indexing and browsing can be implemented in an user-preferred browsing form, and a multimedia data browsing method using the same.

It is another object of the present invention to provide an user profile information structure in which an user-preferred browsing method is contained, for displaying the multimedia data in an user preferred form, and a multimedia data browsing method using the same, in implementing multimedia data indexing and browsing.

It is another object of the present invention to provide an user profile information structure in which an user-preferred browsing method is checked from an user profile, and an application (or browser) is designated according to user preference if there are plurality of applications providing the corresponding browsing method, or an application satisfying the corresponding service is downloaded from other designated place and is provided to the user if there is not such an application, and a multimedia data browsing method using the same.

To achieve the above objects, in content-based multimedia data browsing, there is provided an user profile information structure according to the present invention, which includes an user-preferred application description scheme for browsing in an user profile, in order to provide an user-preferred multimedia browsing method.

In addition, the user-preferred application description scheme stored in the user profile is an application ID, or application locator.

In addition, the application description scheme stored in the above user profile further includes a layout description scheme of an application.

In addition, the number of user-preferred application description schemes stored in the user profile may be plural, and each of the application description schemes further includes a weight describing user preference.

In addition, the user-preferred application description schemes stored in the user profile are different from one another according to the type (genre) of a multimedia data object, each of the application description schemes is structured hierarchically, and the part of the application description scheme having a weight describing scheme based on user preference.

To achieve the above objects of the present invention, in contents-based multimedia data browsing, there is provided a multimedia data browsing method according to the present invention which is characterized in that: (a) multimedia data contains a contents description scheme for indexing/browsing multimedia data; (b) an user profile includes an user preference description scheme indicating an user-preferred multimedia browsing method or browsing criterion as an application description scheme for user-preferred browsing; and (c) multimedia data is browsed based on the user-preferred application description scheme for user-preferred browsing in a corresponding user profile, if the user desires multimedia browsing. In addition, in the multimedia data browsing method of the present invention, the user-preferred multimedia data browsing method or browsing criterion are described differently according to the type or genre of multimedia data, and a multimedia data is browsed based on the description scheme describing each user-preferred browsing method or browsing criterion.

In addition, in the multimedia data browsing method of the present invention, the user-preferred multimedia browsing method or browsing criterion is a character-oriented browsing, character/place relation-oriented browsing, time sequential and scene-oriented browsing, or combination thereof.

In addition, in the multimedia data browsing method of the present invention, the number of browsing method or browsing criterion described differently according to the type of multimedia data may be one or plural with respect to one type (genre) thereof, and weighted values can be added on these browsing methods or browsing criteria.

In addition, in the multimedia data browsing method of the present invention, if there is no application satisfying the user-preferred multimedia browsing method or browsing criterion in the current terminal, in displaying the corresponding multimedia data, such an application is downloaded (or plugged-in) for thereby implementing the same.

In addition, in the multimedia data browsing method of the present invention, if there are a plurality of applications satisfying the user-preferred multimedia browsing method or browsing criterion in the current terminal, in displaying the corresponding multimedia object based on the user-preferred multimedia browsing method or browsing criterion, a locator of an application or browser is included so as to select an appropriate application among the plurality of applications, and the multimedia object is displayed by selecting the application indicated by the locator of the application or browser.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein:

FIG. 5 is a view illustrating a preference description scheme in an user profile information data structure according to the present invention;

FIG. 7 is a view illustrating another example of a preference description scheme in an user profile information data structure according to the present invention.

DETAILED DESCRIPTION OF THE PREFERRED EMBODIMENTS

The preferred embodiments of the present invention will now be described in detail with reference to the accompanying drawings.

Figure 1:
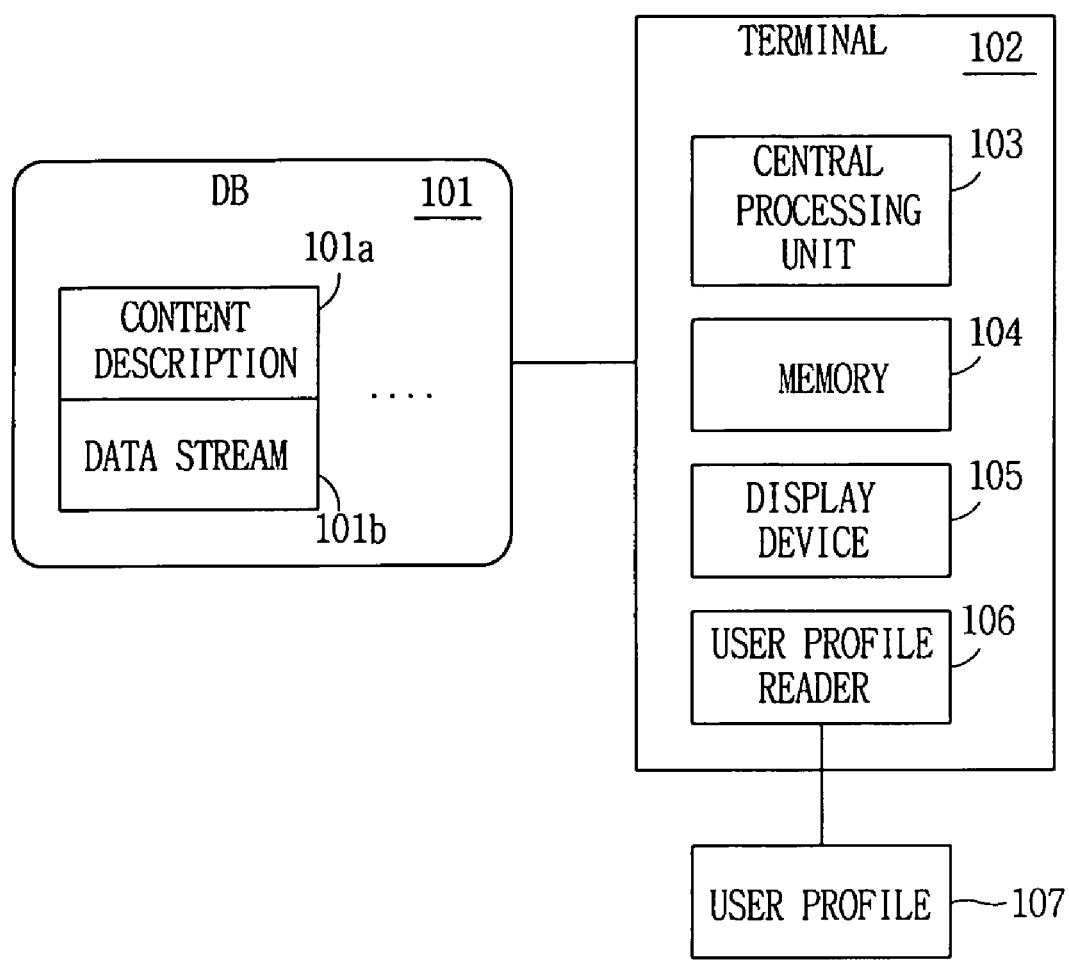
FIG. 1 is a schematic view illustrating the construction of a multimedia system according to the present invention.

First, FIG. 1 is a schematic view illustrating an example of the construction of a multimedia data service system according to the present invention;

A multimedia object 101 has a contents description 101a for content-based indexing/browsing and a data stream 101b.

A terminal 102 includes a central processing unit 103 for performing content-based multimedia indexing and browsing control, a memory 104 for storing a variety of data, a display device 105 for displaying various information relating to multimedia data indexing and browsing, an user profile reader 106 for reading user profile information, and an user profile.

Here, the user profile reader 106 can have the function of a writer for updating information recorded in the user profile 107 based on the feedback of an user.

In addition, the user profile 107 can be a movable medium capable of recording and storing information in the form of a smart card.

In addition, an user-preferred browsing method or browsing criterion is described in the user profile 107, and such information can be updated by learning.

The information contained in the user profile 107 is read out from the user profile reader 106, and is downloaded to the memory 104.

The central processing unit 103 decodes the user profile information downloaded to the memory 104 to thus browse the multimedia object 101 using the corresponding display device 105 by the user-preferred browsing method or browsing criterion.

Figure 2:
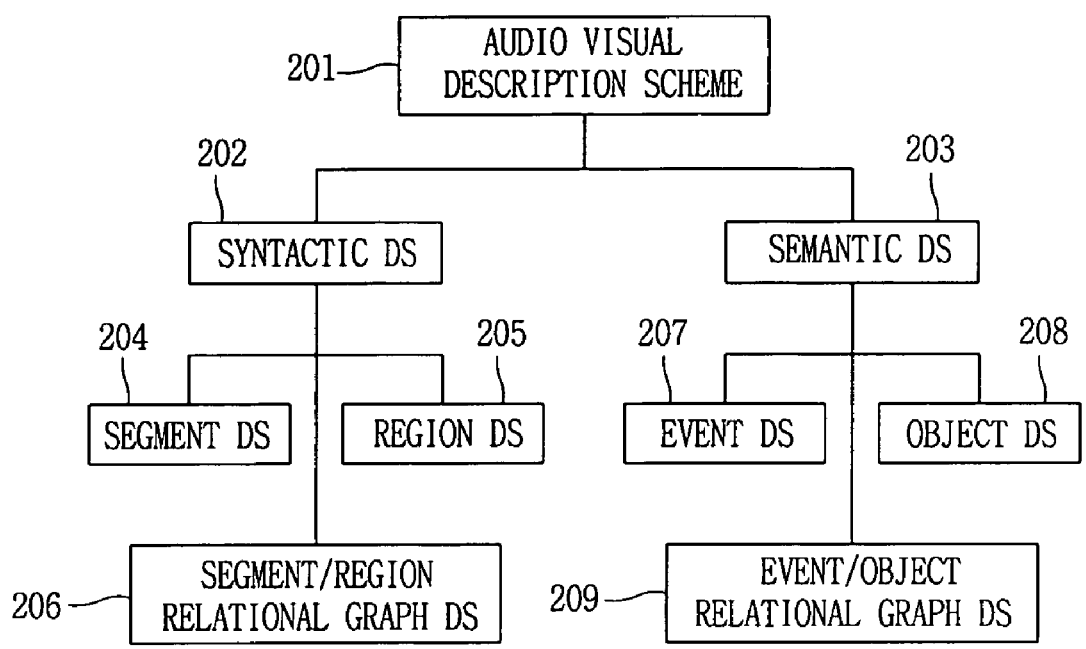
FIG. 2 is a view illustrating an example of a contents description scheme structure of a multimedia object according to the present invention.

FIG. 2 is a view illustrating an example of a contents description scheme structure of a multimedia object for content-based indexing/browsing according to the present invention.

The contents description scheme structure has an audio visual description scheme 201 including a syntactic DS 202 and a semantic DS 203. The syntactic DS 202 includes a segment DS 204, region DS 205, and segment/region relational graph DS 206. The semantic DS 203 includes an event DS 207, object DS 208, and event/object relational graph DS 209.

The syntactic DS 202 describes a physical structure of actual multimedia data, and has segments and regions of the actual multimedia data and information on the relation (link) between them, thus making it possible to index and browse a corresponding section or scene of the multimedia data.

The semantic DS 203 describes a semantic structure of multimedia data. In case of a multimedia data, for example, moving pictures such as drama, events, objects (characters, places, etc,), and the relation between events and characters or places are described, thus enabling content-based indexing and browsing of multimedia data.

The description scheme structure of the multimedia data for content-based multimedia data indexing and browsing is not limited to that as shown in FIG. 2, and can be varied in various forms for the purpose of more effective browsing.

Figure 3:
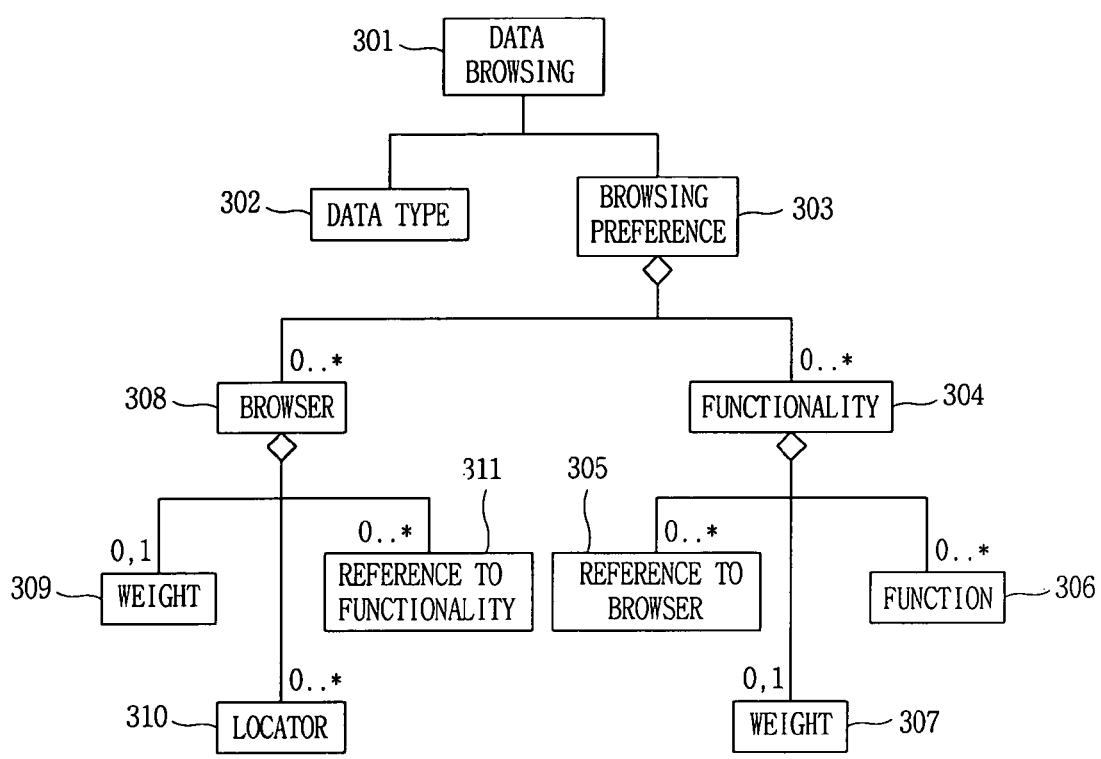
FIG. 3 is a view illustrating an user profile information data structure according to a first embodiment of the present invention.

FIG. 3 is a view illustrating an user profile information data structure for content-based multimedia data browsing according to a first embodiment of the present invention;

The user profile information data structure has a data browsing DS 301 including data type DS 302 and a browsing preference DS 303. Such a data browsing DS structure can be given by the type or genre of each multimedia object.

The browsing preference DS 303 corresponds to the data type DS 302.

The browsing preference DS 303 includes a browser DS 308 as an application DS satisfying user preference and a functionality DS 304 for describing a browsing method or browsing criterion.

The functionality DS 304 for describing a browsing method or browsing criterion has a reference to browser DS 305 for connecting a corresponding browser, a function DS 306 for selecting a browser, and a weight DS 307 for describing a corresponding weight value.

The application DS 308 has a weight DS 309, locator DS 310, and reference to functionality DS 311 for reference to a description scheme for describing a browsing method or standard.

Therefore, by means of the user profile relating to such a user-preferred browsing method (or browsing criterion), it is possible to display a certain particular multimedia data by the user-preferred browsing method or standard in a system of FIGS. 1 and 2.

In other words, when an user displays a multimedia data based on the user profile information, a corresponding application (browser) satisfying description schemes 304 through 307 for describing the user-preferred browsing method or standard for the corresponding data, or having been described in the application description schemes 308 through 311 is indexed in the terminal.

If the corresponding application exists in the terminal, multimedia data is displayed using the same, or if it does not exist in the terminal, the corresponding application is downloaded using the locator DS 310.

In addition, the number of application (browser) included in the application DS is one or more than one. If the number of application is plural, an user-preferred application is employed using the weight DS 309 which is learned based on user preference (user feedback/user's usage pattern of a certain particular browser) for each application.

Figure 4:
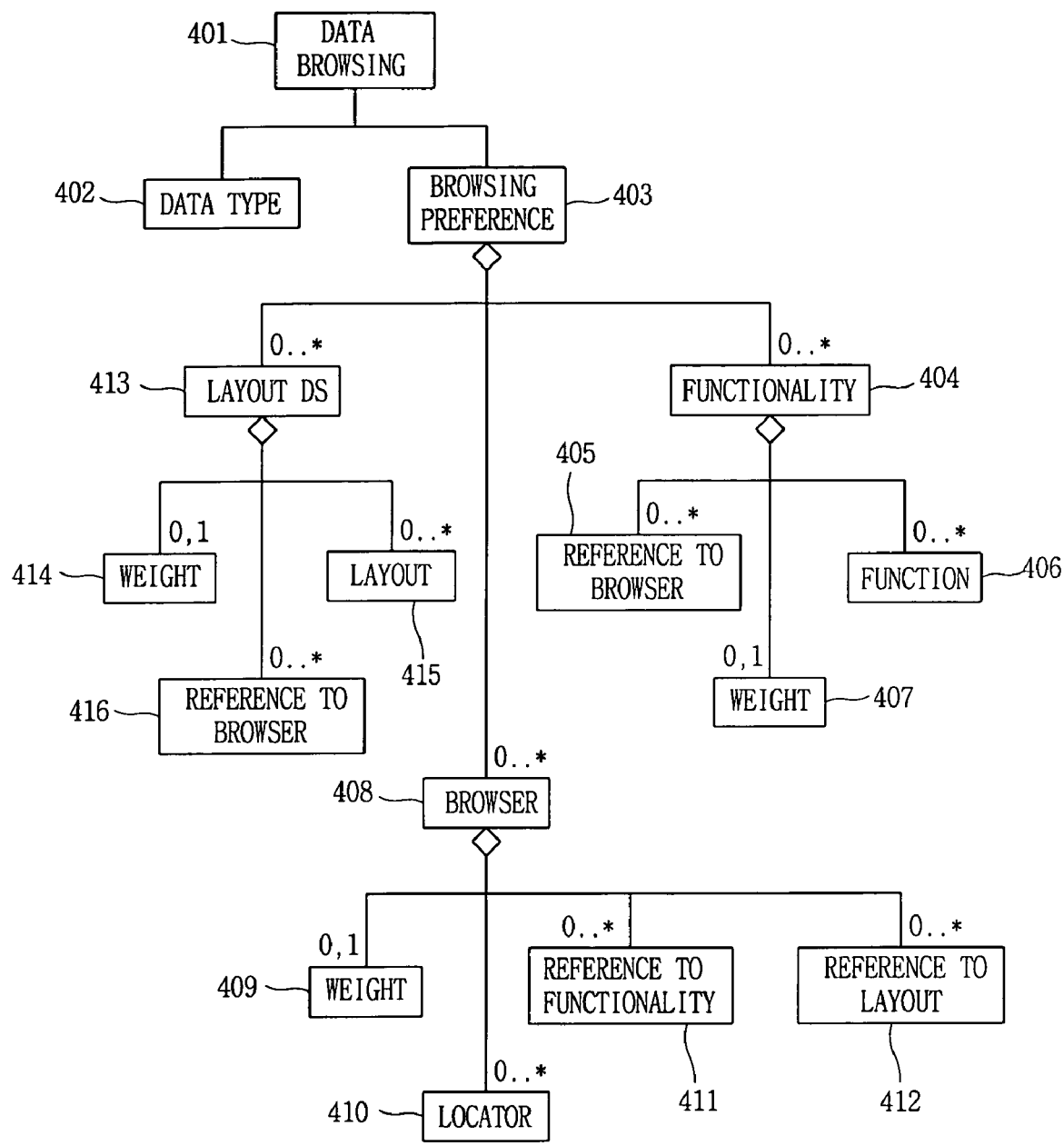
FIG. 4 is a view illustrating an user profile information data structure according to a second embodiment of the present invention.

FIG. 4 is a view illustrating an user profile information data structure for content-based multimedia browsing according to a second embodiment of the present invention, which is formed by further including a layout description scheme of a browser in addition to the structure as described in FIG. 3. In this case, the user can describe preference on a browser according to a certain particular type of multimedia data, but also can describe layout preference DS of the corresponding browser.

As illustrated in FIG. 4, the user profile information data structure has a data browsing DS 401 including a data type DS 402 and a browsing preference DS 403. Such a data browsing DS structure can be given by the type or genre of each multimedia data.

The browsing preference DS 403 corresponds to the data type DS 402.

The browsing preference DS 403 includes a browser DS 408 as an application DS satisfying user preference, a functionality DS 404 for describing a browsing method or browsing criterion, and a layout OS 413 of the browser.

The functionality DS 404 for describing a browsing method or browsing criterion has a reference to browser DS 405 for reference to a corresponding browser, a function DS 406 for selecting a browser, and a weight DS 407 for describing a corresponding weight value.

The application DS 408 has a weight DS 409, locator DS 410, reference to functionality DS 411 for reference to a description scheme for describing a browsing method or standard, and reference to layout DS 412 for layout.

The layout DS 413 has a weight DS 414 for the layout and a reference to browser DS 416 for reference to the browser.

Therefore, by means of the user profile relating to such a user-preferred browsing method (or browsing criterion), it is possible to display a certain particular multimedia data by the user-preferred browsing method or standard in a system of FIGS. 1 and 2. In addition, the layout preference DS of the corresponding browser can be described.

In other words, when an user displays a multimedia data based on the user profile information, a corresponding application (browser) satisfying description schemes 404 through 407 for describing the user-preferred browsing method or standard for the corresponding object, or having been described in the application description schemes 408 through 411 is indexed in the terminal.

At this time, an user-preferred layout of the browser is displayed using the layout DS 413 through 416 and the reference to layout DS 412 in the browser DS.

If the corresponding application exists in the terminal, multimedia data is displayed using the same, or if it does not exist in the terminal, the corresponding application is downloaded using the locator DS 410.

In addition, the number of application (browser) included in the application DS is one or more than one. If the number of application is plural, an user-preferred application is employed using the weight DS 409 which is learned based on user preference for each application.

FIG. 5 is a view illustrating a description scheme of a browsing method or criterion in an user profile information data structure as shown in FIG. 3 or FIG. 4 according to a first embodiment of the present invention.

The structure of FIG. 5 is a function description scheme structure for indexing and displaying a corresponding multimedia data based on character/relation, and includes a basic key item 501 and an order of key item 502.

Figure 6:
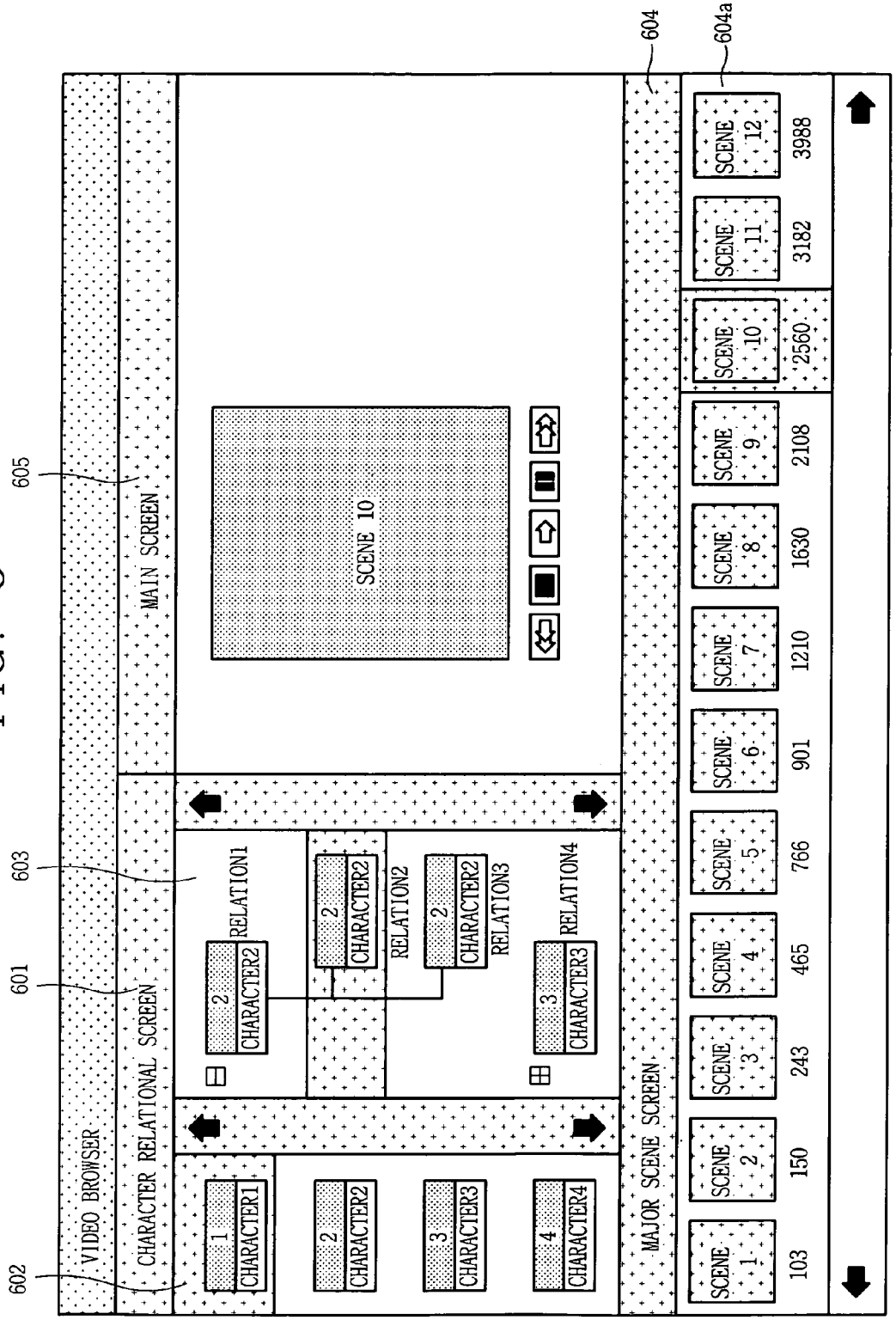
FIG. 6 is a view illustrating an example of a browsing based on user preference.

The basic key item describes browsing on the basis of character and relation 503 and 504. FIG. 6 illustrates an example of a browsing according to such a scheme structure.

As shown in a video browser (user interface) of FIG. 6, a character screen unit 602 of a character relational screen unit 601 displays characters, and a character-relation screen unit 603 displays character-relation satisfying a relation which is selected here.

In addition, a main scene screen unit 604 displays main scenes satisfying the corresponding relation in key frames 604a. Here, it is shown that a main screen unit 605 displays a selected particular scene in more detail.

FIG. 7 is a view illustrating a description scheme of a browsing method or criterion in an user profile information data as shown in FIG. 3 or FIG. 4 according to a second embodiment of the present invention.

The structure of FIG. 7 is a function description scheme structure for displaying a corresponding multimedia data using a 3-level tree in time sequential key frames, and includes a basic key item 701 and an order of key item 702.

The basic key item describes browsing on the basis of key frames, and the order of key item 702 describes time sequential browsing, and describes that the basic key item has a hierarchical structure (depth of key item, level 1= 3 . . . ).

Figure 8:
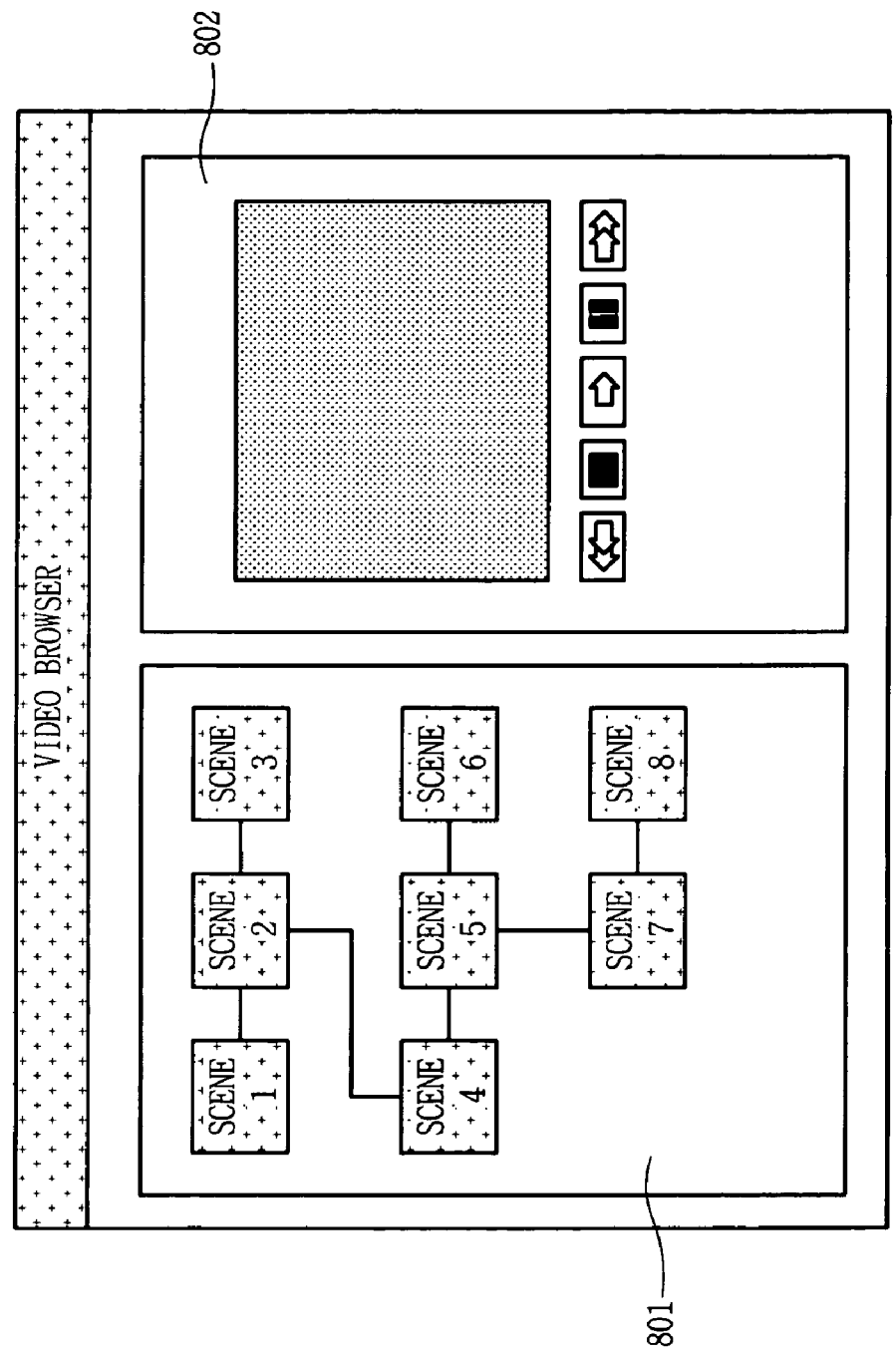
FIG. 8 is a view illustrating another example of a browsing based on user preference.

FIG. 8 is a view illustrating an example of an interface of a browser using the function description scheme structure of FIG. 7.

As shown in a video browser (user interface) of FIG. 8, a key frame unit 601 displays multimedia contents in key frames in a time sequence, and a main screen unit 802 displays a section which is selected here and is represented by key frames.

According to the user profile information data structure and browsing method using the same of the present invention, while implementing content-based moving picture indexing and browsing, an user-preferred browsing method (application) can be provided by each corresponding multimedia data.

Therefore, with respect to a multimedia data selected by the user, the user-preferred browser (application) can display the corresponding multimedia data.

In addition, in the present invention, since the corresponding multimedia data is indexed and browsed by a browser which is close or identical to the user-preferred browsing method (application), an user-friendly and user-adaptive indexing and browsing environment can be provided when multimedia data is indexed and browsed based on contents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method implemented by an apparatus for processing multimedia content and related user preferences, the method comprising:
   (a) storing user preference information in a user profile about a multimedia consumer, the user preference information including browsing preference information that describes the multimedia consumer's preferences for browsing audio-visual content, wherein the browsing preference information includes a hierarchical data structure that specifies
      (i) a plurality of browsing elements that include a first browsing element representing a visual key-frame summary and a second browsing element representing user-preferred browsing based on a content element, wherein said content element includes a character, a place, a time sequence and a scene depicted in the audio-visual content,
      (ii) a first genre to which the plurality of browsing elements apply, and
      (iii) a respective preference value for each browsing element in the plurality of browsing elements, wherein the respective preference value indicates relative importance of the corresponding browsing element for browsing audio-visual content of the first genre;
   (b) receiving an audio-visual content stream having content of the first genre;
   (c) receiving user input that requests displaying content from the audio-visual content stream based on the user profile;
   (d) in response to the user input and based on the preference value for the first browsing element in the browsing preference information of the user profile, displaying content from the audio-visual content stream by using the visual key-frame summary; and
   (e) updating the preference value for the first browsing element based on the multimedia consumer's preference for the visual key-frame summary to browse audio-visual content of the first genre.

2. The method of claim 1, wherein the respective preference value for each browsing element in the plurality of browsing elements defines a respective preference weight.

3. The method of claim 1, wherein the second browsing element specifies selective browsing based on one or more characters depicted in the audio-visual content of the first genre.

4. The method of claim 1, further comprising:
   storing the user profile in a movable storage medium.

5. The method of claim 1, wherein specifying the respective preference value for each browsing element in the plurality of browsing elements includes specifying the respective preference value based on a usage pattern of each browsing element in the plurality of browsing elements.

6. The method of claim 1, further comprising:
   receiving a content description identifying a plurality of segments within the audio-visual content stream; and
   using the content description to enable content based browsing of the audio-visual content stream.

7. A method implemented by an apparatus for processing multimedia content and related user preferences, the method comprising:
   (a) storing browsing preferences of a multimedia consumer, wherein the browsing preferences describe the multimedia consumer's preferences for browsing audio-visual content and include a hierarchical data structure specifying
      (i) a plurality of summary elements that include a first summary element representing a visual key-frame summary and a second summary element representing user-preferred browsing based on a content element, wherein said content element includes a character, a place, a time sequence and a scene depicted in the audio-visual content,
      (ii) a first genre of audio-visual content to which the plurality of summary elements apply, and
      (iii) a respective preference value assigned to each summary element in the plurality of summary elements, the respective preference value indicating relative importance of the corresponding summary element for browsing audio-visual content of the first genre;
   (b) receiving an audio-visual content stream having content of the first genre;
   (c) receiving user input that requests displaying content from the audio-visual content stream based on the stored browsing preferences of the multimedia consumer;
   (d) in response to the user input and based on the preference value for the first summary element in the browsing preferences, displaying content from the audio-visual content stream by using the visual key-frame summary; and
   (e) updating the preference value for the first summary element based on the multimedia consumer's preference for the visual key-frame summary to browse audio-visual content of the first genre.

8. The method of claim 7, wherein the respective preference value for each summary element in the plurality of summary elements defines a respective preference weight.

9. The method of claim 7, wherein the second summary element specifies selective browsing based on one or more characters depicted in the audio-visual content of the first genre.

10. The method of claim 9, wherein browsing based on one or more characters includes character-oriented browsing, character/place relation-oriented browsing, or time sequential browsing.

11. The method of claim 7, further comprising:
receiving a content description identifying a plurality of segments within the audio-visual content stream; and
using the content description to enable content based browsing of the audio-visual content stream.

12. A system for processing multimedia content and related user preferences, the system comprising:
a data storage device for storing browsing preferences of a multimedia consumer in a data structure, wherein the browsing preferences describe the multimedia consumer's preferences for browsing audio-visual content and include a hierarchical data structure specifying
  (i) a plurality of summary elements that include a first summary element representing a visual key-frame summary and a second summary element representing user-preferred browsing based on a content element, wherein said content element includes a character, a place, a time sequence and a scene depicted in the audio-visual content,
  (ii) a first genre of audio-visual content to which the plurality of summary elements apply, and
  (iii) a respective preference value assigned to each summary element of the plurality of summary elements, the respective preference value indicating relative importance of the corresponding summary element for browsing audio-visual content of the first genre; and
a data processing apparatus configured to:
  receive an audio-visual content stream having content of the first genre;
  receive user input that requests displaying content from the audio-visual content stream based on the browsing preferences stored in the data storage device;
  in response to the user input and based on the preference value for the first summary element in the browsing preferences, display content from the audio-visual content stream by using the visual key-frame summary; and
  update the preference value for the first summary element based on the multimedia consumer's preference for the visual key-frame summary to browse audio-visual content of the first genre.

13. The system of claim 12, wherein the respective preference value for each summary element in the plurality of summary elements defines a respective preference weight.

14. The system of claim 12, wherein the second summary element specifies selective browsing based on one or more characters depicted in the audio-visual content of the first genre.

15. The system of claim 14, wherein browsing based on one or more characters includes character-oriented browsing, character/place relation-oriented browsing, or time sequential browsing.

16. The system of claim 12, wherein the data storage device includes a movable storage medium for storing the data structure including the browsing preferences.

17. The system of claim 12, wherein the data processing apparatus is further configured to:
receive a content description identifying a plurality of segments within the audio-visual content stream; and
use the content description to enable content based browsing of the audio-visual content stream.

* * * * *